United States Patent [19]

Hanpachern

[11] 4,319,286
[45] Mar. 9, 1982

[54] SYSTEM FOR DETECTING FADES IN TELEVISION SIGNALS TO DELETE COMMERCIALS FROM RECORDED TELEVISION BROADCASTS

[75] Inventor: Aran Hanpachern, Monterey Park, Calif.

[73] Assignee: Muntz Electronics, Inc., Van Nuys, Calif.

[21] Appl. No.: 110,088

[22] Filed: Jan. 7, 1980

[51] Int. Cl.³ ............................................. H04N 5/78
[52] U.S. Cl. .................................... 360/33; 358/127; 369/50
[58] Field of Search ............ 358/4, 10, 127, 139, 358/160, 165–167, 185, 188, 198; 179/100.1 R, 100.1 PS, 100.1 VC, 1 VC; 360/11, 14, 33, 35, 69, 71, 72.2, 74.4; 369/50

[56] References Cited

U.S. PATENT DOCUMENTS

| | | | |
|---|---|---|---|
| 3,378,775 | 4/1968 | Joseph | 358/188 |
| 3,643,167 | 2/1972 | Moryle | 358/188 |
| 3,843,929 | 10/1974 | Moryle | 358/188 |
| 4,000,517 | 12/1976 | Brickerd, Jr. | 360/61 |
| 4,259,689 | 3/1981 | Bonner et al. | 358/188 |

FOREIGN PATENT DOCUMENTS 54-122106  9/1979  Japan ..................................... 360/33

OTHER PUBLICATIONS

"Electronics Helps Advertisers Keep Track of Their TV Ads", Electronic Design 11, 5/27/71, pp. 26–27.

Primary Examiner—Raymond F. Cardillo, Jr.
Attorney, Agent, or Firm—Keith D. Beecher

[57] ABSTRACT

A system is provided which responds to a fade in the video and audio components of a television signal from a television receiver which is being recorded by a video tape recorder, the system generating an output which actuates the remote pause control of the video tape recorder for a selected time interval so as to interrupt the recording process for that interval.

2 Claims, 4 Drawing Figures

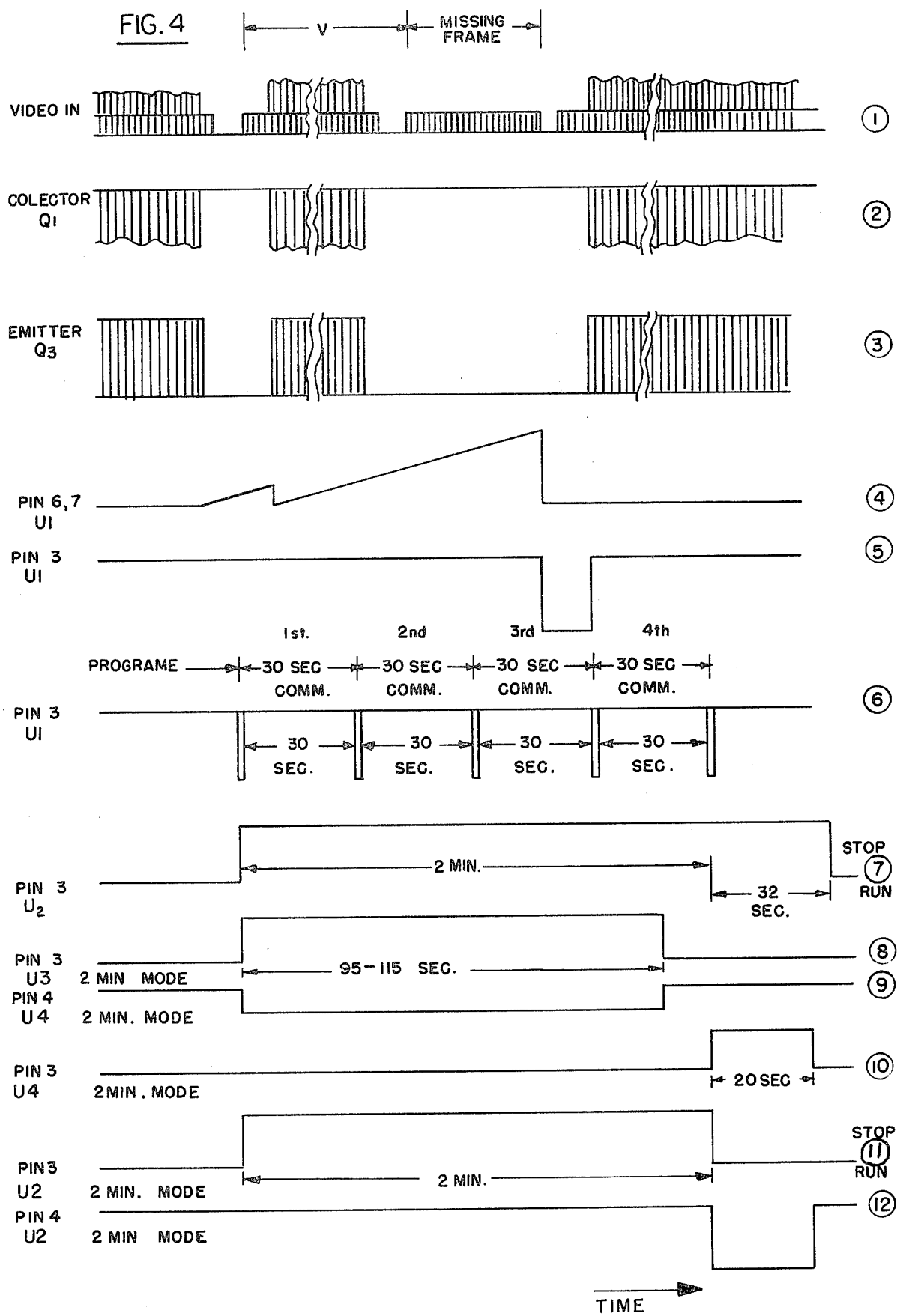

SYSTEM FOR DETECTING FADES IN TELEVISION SIGNALS TO DELETE COMMERCIALS FROM RECORDED TELEVISION BROADCASTS

BACKGROUND

There is presently a wide market for video tape recorders which are constructed to be connected to home television receivers, and which may be set automatically to record selected television programs.

The principal objective of the present invention is to provide a simple and inexpensive unit which may be connected to such a video tape recorder and which responds to the television signals being recorded thereby to interrupt the recording process for the duration of each commercial so as to enable the television program to be recorded free of commercials.

During a television broadcast, when the program changes to a commercial, both the video and audio components of the composite television signal to fade to a low amplitude level. This momentary loss of both the video and audio signal components at the beginning of each commercial is used in the system of the invention to cause the remote pause control of the video tape recorder to interrupt the recording process for a selected interval, corresponding to the length of the commercial.

The pause interval may be selected by generating a missing signal pulse each time there is a loss in both the video and audio signal components, and by applying the missing signal pulses to a one-shot, or equivalent circuit, that has been set to time out, for example, in a few seconds after thirty seconds, or at the end of some other selected time interval, depending upon the length of the individual commercials usually encountered in the program being recorded.

In one operational mode of the unit, a missing signal pulse is generated during the transition between the program and a commercial. This pulse will trigger the one-shot and cause the video tape recorder to interrupt its recording process for thirty-two seconds, that is, until the one-shot times out. If a second commercial is received immediately after the first commercial, a second missing signal pulse will be generated before the one-shot has had a chance to time out and will trigger the one-shot to an additional thirty-two seconds. Accordingly, the one-shot will remain in its triggered state for so long as a succession of thirty-second commercials are being received. A limitation in the operation of the unit in this mode is that it will also respond to a missing signal pulse generated during the transition between the last commercial of the group and the resumption of the program, so that thirty-two seconds of the initial portion of the resumed program will be lost. Usually the loss of information is sufficiently slight so as not to be noticeable to the viewer.

In a second operational mode, the unit responds to the first missing signal pulse generated during the transition between the program and the first commercial to put the video tape recorder in "Pause" for two minutes. This time corresponds to the time interval usually allotted to each group of commercials during commercial television broadcasting. During this latter operational mode, the unit will time out at the end of two minutes so that, normally, there will be no loss of program, as occurs when the unit is in its first operational mode, as explained in the previous paragraph.

The embodiment to be described has a feature, in that it will be maintained in its two-minute mode, only so long as missing signal pulses are received every thirty seconds to indicate that a group of successive commercials are being received during the two-minute interval. If such a missing signal pulse is not received, the unit will time out at the end of the following thirty-two seconds and the recording process will be resumed.

BRIEF DESCRIPTION OF THE DRAWINGS

FIG. 4 is a series of curves useful in explaining the operation of the circuit of FIG. 3.

DETAILED DESCRIPTION OF THE ILLUSTRATED EMBODIMENT

Figure 1:
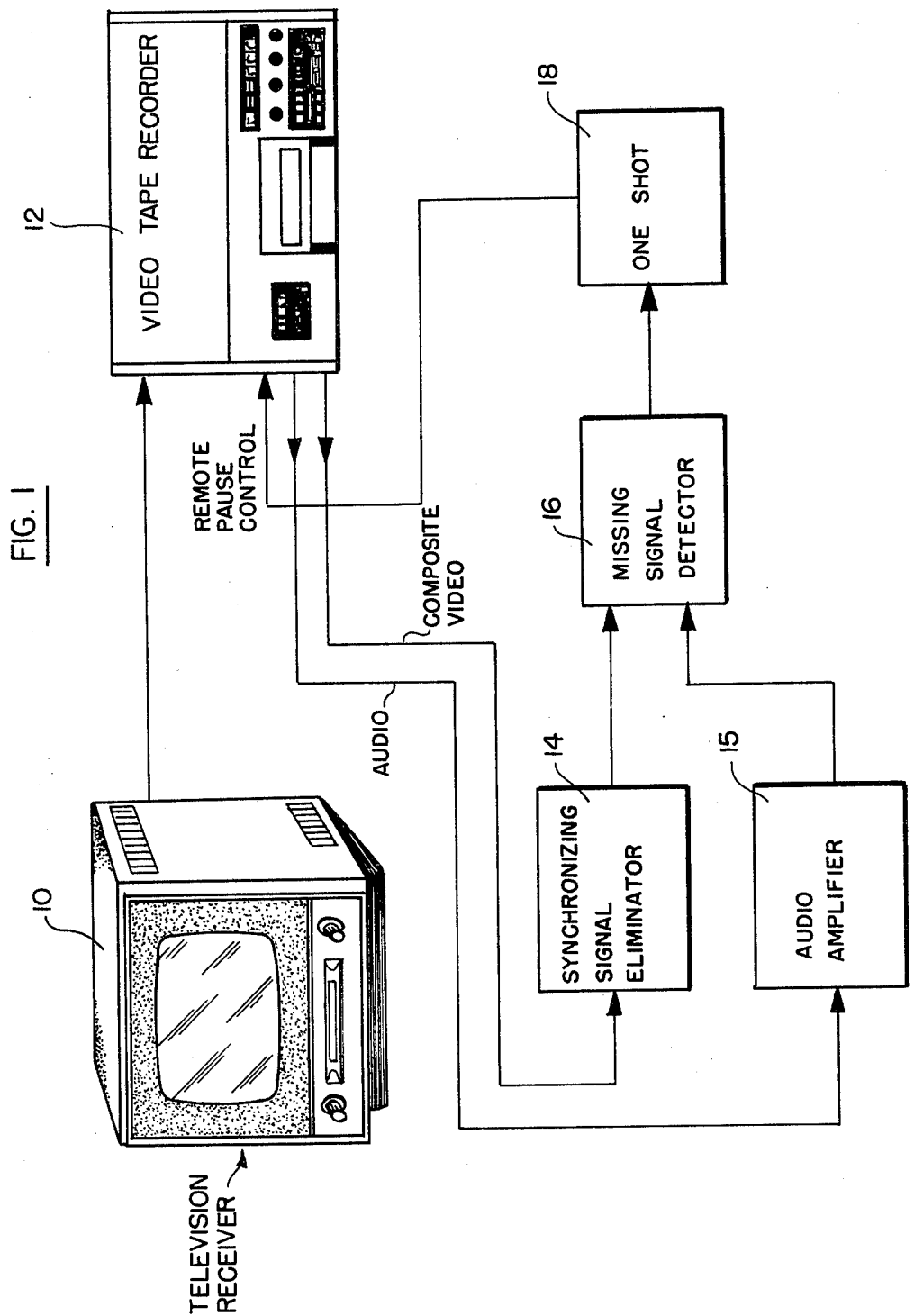
FIG. 1 is a schematic representation of a home television receiver and a video tape recorder connected to the receiver, and a block diagram of a control unit and system in accordance with one embodiment of the present invention for deleting commercials from a television program recorded by the video tape recorder.

In the system of FIG. 1, a television receiver 10 is connected to a video tape recorder 12. The video tape recorder may be set automatically to record selected programs from the television receiver. The system of the present invention, in one of its embodiments, is represented by the blocks interposed between the television receiver and the video tape recorder. The blocks include a synchronizing signal eliminator 14 and an audio amplifier 15 which are connected to a missing signal detector 16. The output of the missing signal detector 16 is introduced to a one-shot 18. The one-shot may be set to time out in thirty-two seconds, which corresponds to just over the length of the present-day thirty-second commercials. The output of the one-shot is applied to the remote pause control circuit of the video tape recorder.

In the operation of the system, the audio components of the television signal being recorded at any particular time are applied to audio amplifier 15, and the composite video components are applied to the synchronizing signal eliminator 14. The synchronizing signal eliminator removes the synchronizing signal components from the composite video, and produces an output representative, for example, of the peak output of the composite video. The audio amplifier 15, on the other hand, produces an output representative of the peak amplitude of the audio signal. The missing signal detector 16 is in the nature of an "and" gate, and it produces a missing signal pulse at its output whenever both the outputs from the blocks 14 and 15 drop simultaneously to a particular low amplitude value.

The missing signal pulse output of detector 16 triggers the one-shot 18, and causes the one-shot to apply a control pulse to the remote pause control of the video tape recorder 12, thereby interrupting the recording process. The output of the one-shot 18 continues for 32 seconds.

It will be appreciated that when the television signal being recorded contains a group of commercials, the missing signal detector 16 will generate a missing signal pulse in 30 second intervals, corresponding to the 30 second length of the commercials, and these pulses will serve to re-start the one-shot 18, so that the video tape recorder 12 will remain in pause for the duration of all the commercials in the group. After the last commercial has been received, the one-shot 18 will time out in 32 seconds after the missing signal pulse corresponding to the transition between the last commercial and the resumed program, and the video tape recorder will then resume recording.

Figure 2:
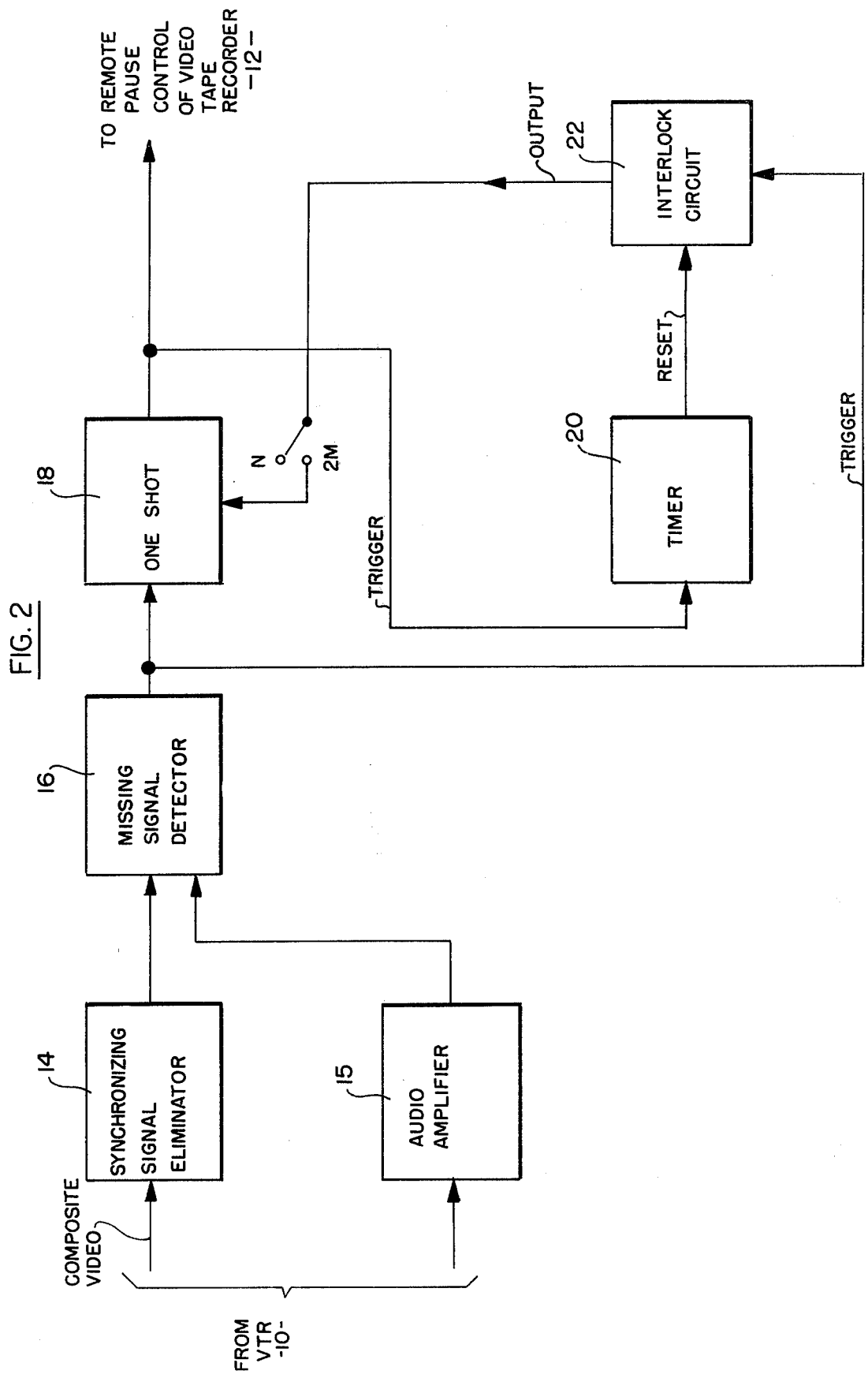
FIG. 2 is a more detailed block diagram of the control system of FIG. 1.

The system of FIG. 2 is generally similar to the system of FIG. 1, however, the system of FIG. 2 also includes a timer 20 and an interlock circuit 22 which permits the overall system to be operated in two modes. In a first mode, designated the "30-second" mode, the system operates in the manner described above, in that is responds to each transition between a normal program and a commercial and between successive commercials to hold the video tape recorder 12 in its pause mode so long as the series of commercials continue. The system of FIG. 2, however, also has a "2-minute" mode during which timer 20 is activated.

In the 2-minute mode, and as explained above, the system responds to the first transition between the normal program and a commercial to hold the video tape recorder in its pause mode for 2-minutes. This time interval corresponds to the usual total time of each commercial break. It is to be understood, of course, that the 30 second interval selected for the individual commercial breaks corresponds to usual present-day practice, as does the 2-minute interval selected for the total commercial break, and other times may be selected to correspond with other commercial interruption practices.

Figure 3:
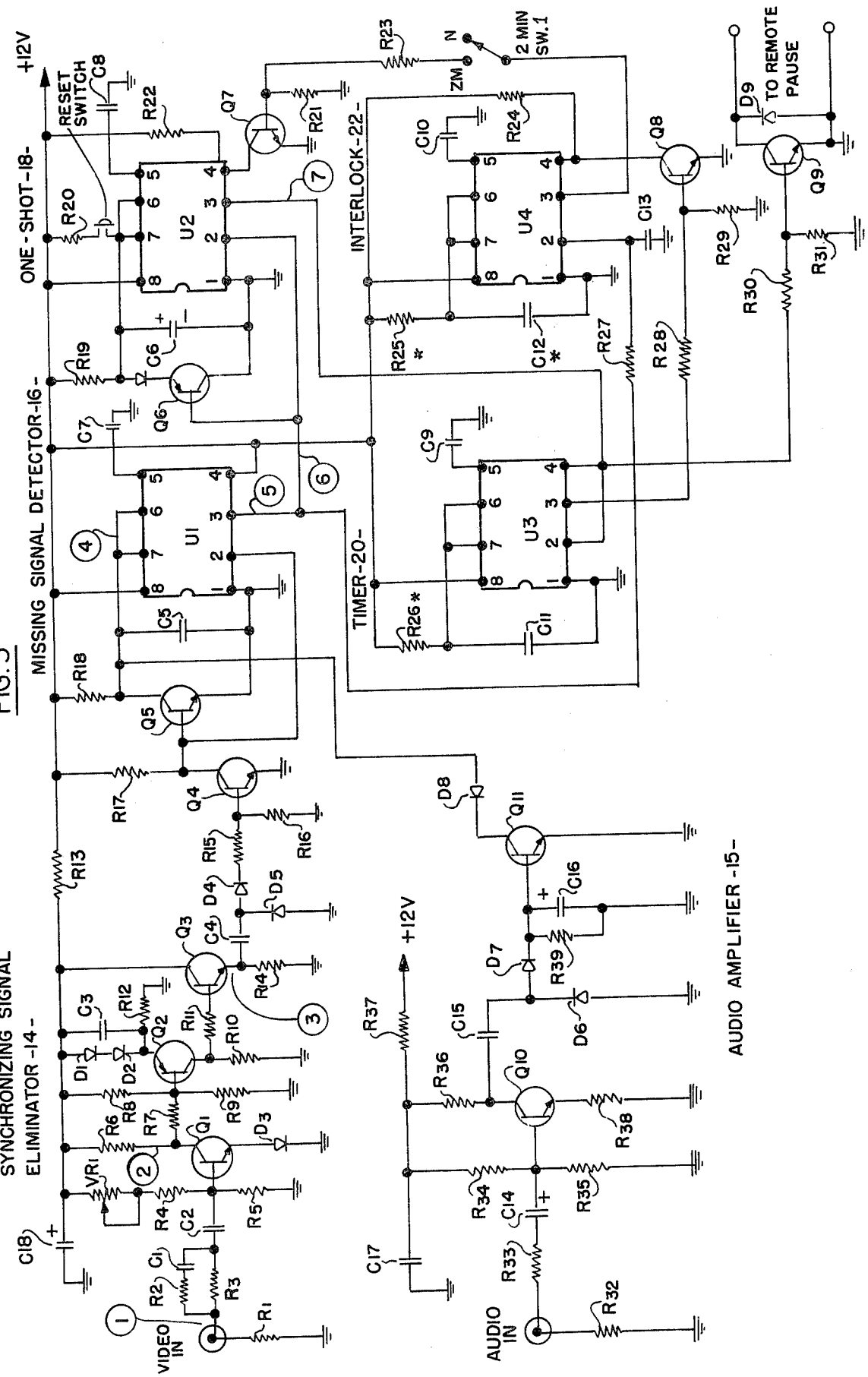
FIG. 3 is a circuit diagram of the system of FIG. 2.

The system of FIG. 2 is shown in circuit detail in FIG. 3. In FIG. 3, the elements designated as "R" are resistors, and have the following values:

R1: 75 ohms
R2, R37, R38: 470 ohms
R3, R5, R7, R11, R33: 1.2 kilo-ohms
R4: 8.2 kilo-ohms
R5: 2.7 kilo-ohms
R8, R17, R22, R24, R27: 6.8 kilo-ohms
R9, R32: 220 kilo-ohms
R10, R12, R16, R21, R23, R28–R31: 10 kilo-ohms
R13: 100 ohms
R14, R21, R30: 820 ohms
R18: 357 kilo-ohms
R19: 2.2 megohms
R25: 470 kilo-ohms
R26: 4.3 megohms
R34: 100 kilo-ohms
R35: 15 kilo-ohms
R36: 4.7 kilo-ohms
R39: 1 megohm The elements designated by "C" are capacitors, and have the following values:

C1: 0.01 microfarad
C2, C18: 22 microfarads
C3, C14, C15: 4.7 microfarads
C4, C16: 1 microfarad
C5: 0.56 microfarads
C6, C11, C12: 22 microfarads
C7, C8, C9, C10: 0.02 microfarads
C13: 470 picofarads
C17, C20: 100 microfarads
C19: 470 microfarads The transistors designated Q1, Q3, Q4, Q7, Q8, Q9, Q10 and Q11 are NPN transistors of the type designated 2N3904; and the transistors designated Q2, Q5 and Q6 are PNP transistors of the type designated 2N3906.

The elements indicated as "D" are diodes, the diodes D1–D9 being of the type designated IN4148, and the diodes D10–D13 being of the type designated IN4001. The elements designated U1–U4 are one-shot trigger integrated circuits of the type designated NE555.

The operation of the circuit of FIG. 3 is as follows. The video input signal from the video tape recorder 12 of FIG. 1 is applied to the base of transistor Q1 (curve 1 of FIG. 4). Potentiometer VR1 is set to cause the circuit of transistor Q1 to eliminate the negative synchronizing pulses from the composite video signal, so that only video information without the synchronizing components appears at the collector of transistor Q1 (curve 2 of FIG. 4). The video signal is amplified by transistors Q2 and Q3, and the amplified video signal appears at the emitter of transistor Q3 (curve 3 of FIG. 4).

The transistors Q4 and Q5 and integrated circuit U1 form the missing signal detector 16. The transistor Q5 applies a signal having the waveform 4 of FIG. 4 to input pins 6 and 7 of integrated circuit U1. Resistor R18 and capacitor C5 are set so that integrated circuit U1 will generate a pulse (curve 5 of FIG. 4) at its pin 3 when a missing frame of the video information is detected, this missing frame corresponding to a transition between a normal program and a commercial, or between one commercial and a subsequent commercial, or between a commercial and the normal program.

In the first, or "thirty-second" mode of the circuit, the 2-minute switch SW1 is set to the open "N" contact, so that integrated circuits U3 and U4 are inactive. During this mode, the output at pin 3 of integrated circuit U1 is applied to pin 2 of integrated circuit U2 and to the base of transistor Q6. The integrated circuit U2 and transistor Q6 form a one-shot which is set, for example, to 32 seconds by resistor R19 and capacitor C6. Therefore, the output at pin 3 of integrated circuit U2 will stay high (curve 7 of FIG. 4) so long as pin 2 of integrated circuit U2 receives trigger pulses from pin 3 of integrated circuit U1 at 30 second intervals, corresponding to a series of 30 second commercials (curve 6 of FIG. 4). However, after the last trigger pulse from the integrated circuit U1 corresponding, for example, to the last commercial, is received, pin 3 of integrated circuit U2 will go low after an interval of 32 seconds, as shown by curve 7 of FIG. 4.

The circuit of transistor Q9 is connected to the remote pause control of the video tape recorder 12. The output at pin 3 of integrated circuit U2 (curve 7 of FIG. 4) is applied to the base of transistor Q9 and, so long as the series of commercials continues, the integrated circuit U1 will continue to trigger the integrated circuit U2 at 30 second intervals, as shown by the curve 6 of FIG. 4, and the output at pin 3 of integrated circuit U2 (curve 7 of FIG. 4) will remain high to cause the circuit of transistor Q9 to hold the video tape recorder in its pause mode. However, at the end of the last commercial, the integrated circuit U2 will time out, as shown by curve 7 of FIG. 4, and will remove the pause control from the video tape recorder.

During the first, or "30-second" mode of operation of the circuit of FIG. 3, the circuit responds to each transition between the normal program and a commercial, and between successive commercials, and between; a commercial and the normal program, to place the video tape recorder 12 in a pause mode for 32 seconds which corresponds to the length of the usual commercial plus two seconds. Then, if a second commercial is received before the 32 seconds elapses, the video tape recorder is held in its pause mode for another 32 seconds, and this continues so long as the series of commercials is being received.

In the 2-minute mode of operation of the circuit of FIG. 3, and as explained briefly above, the circuit responds to the transition between a normal program and the first commercial to place the video tape recorder in its pause mode for 2-minutes corresponding to the usual total time of each commercial break in the normal program, which in turn corresponds to four 30-second commercials. For the 2-minute mode, the 2-minute switch SW1 is closed on its contact 2M.

When the switch SW1 is closed on its 2M contact to place the system of FIG. 3 in the 2-minute mode, the output pin 3 of integrated circuit U4 is connected to the base of transistor Q7. The integrated circuit U3 is a one-shot which serves as a 90–115 second timer, this being established by selecting appropriate values for resistor R26 and capacitor C11. The integrated circuit U3 is triggered by the output at pin 3 of integrated circuit U2 (curve 7 of FIG. 4) which is connected to input pins 2 and 4 of integrated circuit U3.

When the output at pin 3 of integrated circuit U2 goes from low to high, as shown in curve 7 of FIG. 4, indicating a transition between normal programming and a first commercial, this output will trigger integrated circuit U3, and the output of integrated circuit U3 at pin 3 will go high and remain high for 95–115 seconds, as shown by curve 8 of FIG. 4. During this interval, integrated circuit U3 will prevent integrated circuit U4 from being triggered, this being achieved by the circuit of transistor Q8.

The integrated circuit U4 is held in its reset mode by the output signal of transistor Q8 (curve 9 of FIG. 4) whose base is connected to the output pin 3 of integrated circuit U3. The output at pin 3 of integrated circuit U4 will stay low, accordingly, and will not change state, even if trigger pulses are received at its pin 2 from the output at pin 3 of integrated circuit U1. However, after three of the four commercials of the group have been received, the output at pin 3 of integrated circuit U3 will go low, as shown in curve 8 of FIG. 4, and the reset pulse to pin 4 of integrated circuit U4 will go high (curve 9 of FIG. 4) permitting the integrated circuit U4 to be triggered.

At the end of the fourth commercial, the integrated circuit U4 will be triggered by the output at pin 3 of integrated circuit U1 (curve 6 of FIG. 4) which is applied to input terminal 2 of integrated circuit U4. Then, the output of integrated circuit U4 at its pin 3 will go high, as shown in curve 10 of FIG. 4, and will remain high for 20 seconds. This output is applied to the base of transistor Q7, and the leading edge of the resulting pulse at the collector of transistor Q7 (curve 12 of FIG. 4) will reset integrated circuit U2, and cause the output of integrated circuit U2 at its number 3 pin to go low at the end of 2-minutes (curve 11 of FIG. 4), that is, right after the fourth and last commercial of the group, so that no program time is lost.

Therefore, in the 2-minute mode, the system responds to the first program-commercial transistor of a group of commercials to disable the video tape recorder 12, and it responds to a subsequent transition between the last commercial of the group and the program immediately to re-start the video tape recorder without any loss of program material.

The circuitry of audio amplifier 15 assures that the circuit of FIG. 3 will respond to video signal fades only when the audio signal also falls to a minimum amplitude. This is to prevent false operations of the system which would otherwise occur whenever the video signal fades during normal programs.

In the audio amplifier circuit, transistor Q10 amplifies the audio signal derived from video tape recorder 12 in FIG. 1, and the amplified audio signal is rectified by diodes D6 and D7. Therefore, so long as the audio signal has appreciable amplitude, transistor Q11 is forward biased, and its output is relatively low, and serves to clamp pins 6 and 7 of the integrated circuit U2. This action prevents the integrated circuit U2 of the missing signal detector 16 to operate except when both the video and audio signals fall together to a low amplitude value which occurs at the transition between the normal program and a commercial, and between successive commercials.

The invention provides, therefore, an improved unit which may be interposed between a television receiver and a video tape recorder, and which responds to the television signal received by the receiver to disable the recorder for the duration of the commercial messages. As described above, the system incorporated into the unit may be constructed to have a normal mode in which it responds to each transition between the normal program and a commercial, and between successive commercials, to disable the video tape recorder for a predetermined interval in each case, of the order, for example, of 30 seconds. The system also has a second mode in which it responds to the transition between the normal program and a first commercial to disable the video tape recorder for a predetermined interval corresponding, for example, to several commercials, and which then responds to the transition between the last commercial of the group and the resumed program to reactivate the video tape recorder 32 seconds after the termination of the last commercial.

It will be appreciated that while a particular embodiment of the invention has been shown and described, modifications may be made. It is intended in the claims to cover the modifications which come within the true spirit and scope of the invention.

What is claimed is:

1. A system for interrupting the recording process of a video tape recorder in the recordation of a television signal derived from a television receiver, said television signal including composite video signal components and audio signal components, said system including: a first circuit means adapted to be connected to the video tape recorder and responsive to the video signal components of the television signal for producing an output signal having a particular reference level when the video signal components fade to a predetermined low amplitude for a particular time interval; detector means connected to said first circuit means and responsive to the output signal therefrom for developing an output pulse when the output signal from said first circuit means drops to said predetermined reference signal for said particular time intervals; trigger circuit means connected to said detector circuit means and responsive to the output pulse therefrom for producing a control signal of a predetermined duration; circuit means connected to said trigger circuit means and responsive to the control signal therefrom to interrupt the recording process of the video tape recorder for a time interval corresponding to the duration of said control signal; a further trigger circuit connected to the detector circuit means and responsive to the output pulse therefrom to be triggered from a reset state to a set state; circuitry connecting said further trigger circuit to said first-named trigger circuit to prevent said first-named trigger circuit from resetting so long as said second trigger circuit is in its reset state; and a third trigger circuit connected to said first-named trigger circuit to be triggered from its reset state to its set state when the first-named trigger circuit is triggered to its set state, said third trigger circuit remaining in its set state for a predetermined time interval, and circuitry connecting said third trigger circuit to said second trigger circuit to prevent said second trigger circuit from being set so long as said third trigger circuit is in its set state.

2. The system defined in claim 1, and which includes a second circuit means adapted to be connected to the video tape recorder and responsive to the audio signal components of the television signal for producing an output signal having a particular reference level when the audio signal components fall to a predetermined low amplitude; and in which said detector means is connected to said first and second circuit means and is responsive to both the output signals therefrom for developing the output pulse when both the output signals from said first and second circuit means drop to the predetermined reference level.

* * * * *